(12) United States Patent
Shi et al.

(10) Patent No.: US 7,515,575 B1
(45) Date of Patent: Apr. 7, 2009

(54) INTELLIGENT ACCESS POINT SCANNING WITH SELF-LEARNING CAPABILITY

(75) Inventors: Jianxiong Shi, Pleasanton, CA (US); Joseph G. Baranowski, Morgan Hill, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 424 days.

(21) Appl. No.: 11/212,353

(22) Filed: Aug. 26, 2005

(51) Int. Cl.
*H04Q 7/24* (2006.01)

(52) U.S. Cl. .................. 370/338; 370/310; 370/328; 370/334; 455/41.2; 455/434; 455/550.1; 455/553.1; 455/500

(58) Field of Classification Search ............... 455/41.2, 455/426.2, 550.1, 552.1, 553.1, 574, 434, 455/500, 435.1, 435.2, 435.3; 370/338, 328, 370/334, 310
See application file for complete search history.

(56) References Cited

U.S. PATENT DOCUMENTS

| | | | |
|---|---|---|---|
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellineig et al. |
| 5,267,261 A | 11/1993 | Blakeney, II et al. |
| 5,333,175 A | 7/1994 | Ariyavisitakul et al. |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |
| 5,428,601 A | 6/1995 | Owen |
| 5,442,680 A | 8/1995 | Schellinger et al. |
| 5,448,619 A | 9/1995 | Evans et al. |
| 5,507,035 A | 4/1996 | Bantz et al. |
| 5,533,027 A | 7/1996 | Akerberg et al. |
| 5,594,782 A | 1/1997 | Zicker et al. |
| 5,610,969 A | 3/1997 | McHenry |
| 5,634,193 A | 5/1997 | Ghisler |
| 5,640,414 A | 6/1997 | Blakeney, II et al. |
| 5,659,598 A | 8/1997 | Byrne |
| 5,659,878 A | 8/1997 | Uchida et al. |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |

(Continued)

FOREIGN PATENT DOCUMENTS

EP   0936777 A1   8/1999

(Continued)

OTHER PUBLICATIONS

U.S. Appl. No. 10/116,311, (Non-Final Office Action mailed: Feb. 9, 2006) filed Apr. 2, 2002, Jahangir Mohammed.

(Continued)

*Primary Examiner*—Charles N Appiah
*Assistant Examiner*—Olumide T Ajibade Akonai
(74) *Attorney, Agent, or Firm*—Adeli & Tollen LLP

(57) ABSTRACT

A method and apparatus for intelligent access point scanning with self-learning capability enables a wireless handset to conserve power while scanning for unlicensed mobile access.

46 Claims, 6 Drawing Sheets

U.S. PATENT DOCUMENTS

| | | | |
|---|---|---|---|
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,815,525 A | 9/1998 | Smith |
| 5,818,820 A | 10/1998 | Anderson et al. |
| 5,822,681 A | 10/1998 | Chang et al. |
| 5,825,759 A | 10/1998 | Liu |
| 5,852,767 A | 12/1998 | Sugita |
| 5,870,677 A | 2/1999 | Takahashi et al. |
| 5,887,020 A | 3/1999 | Smith et al. |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt et al. |
| 5,915,224 A | 6/1999 | Jonsson |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,960,361 A | 9/1999 | Chen |
| 5,995,828 A | 11/1999 | Nishida |
| 6,016,318 A | 1/2000 | Tomoike |
| 6,035,193 A | 3/2000 | Buhrmann et al. |
| 6,052,592 A | 4/2000 | Schellinger et al. |
| 6,101,176 A | 8/2000 | Honkasalo |
| 6,112,080 A | 8/2000 | Anderson et al. |
| 6,112,088 A | 8/2000 | Haartsen |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,226,515 B1 | 5/2001 | Pauli |
| 6,236,852 B1 | 5/2001 | Veerasamy et al. |
| 6,243,581 B1 | 6/2001 | Jawanda |
| 6,256,511 B1 | 7/2001 | Brown |
| 6,263,211 B1 | 7/2001 | Brunner |
| 6,269,086 B1 | 7/2001 | Magana et al. |
| 6,320,873 B1 | 11/2001 | Nevo et al. |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith et al. |
| 6,415,158 B1 | 7/2002 | King et al. |
| 6,430,395 B2 | 8/2002 | Arazi et al. |
| 6,434,389 B1 * | 8/2002 | Meskanen et al. ........... 455/437 |
| 6,438,117 B1 | 8/2002 | Grilli et al. |
| 6,445,921 B1 | 9/2002 | Bell |
| 6,463,307 B1 | 10/2002 | Larsson et al. |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo et al. |
| 6,633,761 B1 | 10/2003 | Singhal |
| 6,643,512 B1 | 11/2003 | Ramaswamy |
| 6,647,426 B2 | 11/2003 | Mohammed |
| 6,658,250 B1 | 12/2003 | Ganesan et al. |
| 6,665,276 B1 | 12/2003 | Culbertson et al. |
| 6,675,009 B1 | 1/2004 | Cook |
| 6,680,923 B1 | 1/2004 | Leon |
| 6,711,400 B1 | 3/2004 | Aura |
| 6,766,160 B1 | 7/2004 | Lemilainen |
| 6,788,656 B1 | 9/2004 | Smolentzov et al. |
| 6,801,519 B1 | 10/2004 | Mangel |
| 6,801,772 B1 | 10/2004 | Townend et al. |
| 6,801,777 B2 | 10/2004 | Rusch |
| 6,807,417 B2 | 10/2004 | Sallinen |
| 6,824,048 B1 | 11/2004 | Itabashi et al. |
| 6,826,154 B2 | 11/2004 | Subbiah et al. |
| 6,829,227 B1 | 12/2004 | Pitt |
| 6,842,462 B1 | 1/2005 | Ramjee et al. |
| 6,845,095 B2 | 1/2005 | Krishnarajah et al. |
| 6,895,255 B1 | 5/2005 | Bridgelall |
| 6,909,705 B1 | 6/2005 | Lee et al. |
| 6,922,559 B2 | 7/2005 | Mohammed |
| 6,925,074 B1 | 8/2005 | Vikberg et al. |
| 6,937,862 B2 | 8/2005 | Back et al. |
| 6,970,719 B1 | 11/2005 | McConnell et al. |
| 7,009,952 B1 | 3/2006 | Razavilar et al. |
| 7,200,112 B2 * | 4/2007 | Sundar et al. ............... 370/230 |
| 2001/0029186 A1 | 10/2001 | Canyon et al. |
| 2001/0031645 A1 | 10/2001 | Jarrett |
| 2001/0046860 A1 | 11/2001 | Lee |
| 2001/0049790 A1 | 12/2001 | Faccin et al. |
| 2002/0045459 A1 | 4/2002 | Morikawa |
| 2002/0066036 A1 | 5/2002 | Makineni |
| 2002/0075844 A1 | 6/2002 | Hagen |
| 2002/0082015 A1 | 6/2002 | Wu |
| 2002/0085516 A1 | 7/2002 | Bridgelall |
| 2002/0102974 A1 | 8/2002 | Raith |
| 2002/0118674 A1 | 8/2002 | Faccin et al. |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0155829 A1 | 10/2002 | Proctor, Jr. et al. |
| 2002/0160811 A1 | 10/2002 | Jannette et al. |
| 2002/0166068 A1 | 11/2002 | Kilgore |
| 2002/0191575 A1 | 12/2002 | Kalavade et al. |
| 2002/0197984 A1 | 12/2002 | Monin et al. |
| 2003/0007475 A1 | 1/2003 | Tsuda et al. |
| 2003/0031151 A1 | 2/2003 | Sharma et al. |
| 2003/0043773 A1 | 3/2003 | Chang |
| 2003/0087653 A1 | 5/2003 | Leung |
| 2003/0112789 A1 | 6/2003 | Heinonen |
| 2003/0119480 A1 | 6/2003 | Mohammed |
| 2003/0119490 A1 | 6/2003 | Mohammed |
| 2003/0119527 A1 | 6/2003 | Labun |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0139184 A1 | 7/2003 | Singh et al. |
| 2003/0142673 A1 | 7/2003 | Patil |
| 2003/0176186 A1 | 9/2003 | Mohammed |
| 2003/0193952 A1 | 10/2003 | O'Neill |
| 2003/0210199 A1 | 11/2003 | Sward et al. |
| 2003/0219024 A1 | 11/2003 | Purnadai et al. |
| 2004/0008649 A1 | 1/2004 | Wybenga |
| 2004/0009749 A1 | 1/2004 | Arazi et al. |
| 2004/0013099 A1 | 1/2004 | O'Neill |
| 2004/0037312 A1 | 2/2004 | Spear |
| 2004/0053623 A1 | 3/2004 | Hoff et al. |
| 2004/0068571 A1 | 4/2004 | Ahmavaara |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0116120 A1 | 6/2004 | Mohammed et al. |
| 2004/0147223 A1 | 7/2004 | Cho |
| 2004/0171378 A1 | 9/2004 | Rautila |
| 2004/0192211 A1 | 9/2004 | Gallagher et al. |
| 2004/0202132 A1 | 10/2004 | Heinonen |
| 2004/0203346 A1 | 10/2004 | Myhre et al. |
| 2004/0203737 A1 | 10/2004 | Myhre et al. |
| 2004/0203745 A1 * | 10/2004 | Cooper ................ 455/432.1 |
| 2004/0203800 A1 | 10/2004 | Myhre et al. |
| 2004/0203815 A1 | 10/2004 | Shoemake et al. |
| 2005/0064896 A1 | 3/2005 | Rautiola et al. |

| | | | |
|---|---|---|---|
| 2005/0101245 A1 | 5/2005 | Ahmavaara | |
| 2005/0101329 A1 | 5/2005 | Gallagher | |
| 2005/0153736 A1* | 7/2005 | Ganton | 455/553.1 |
| 2005/0181805 A1 | 8/2005 | Gallagher | |
| 2005/0186948 A1 | 8/2005 | Gallagher | |
| 2005/0198199 A1 | 9/2005 | Dowling | |
| 2005/0207395 A1 | 9/2005 | Mohammed | |
| 2005/0255879 A1 | 11/2005 | Shi | |
| 2005/0265279 A1 | 12/2005 | Milan | |
| 2005/0266853 A1 | 12/2005 | Gallagher | |
| 2005/0271008 A1 | 12/2005 | Gallagher | |
| 2005/0272424 A1 | 12/2005 | Gallagher | |
| 2005/0272449 A1 | 12/2005 | Gallagher | |
| 2006/0009201 A1 | 1/2006 | Gallagher | |
| 2006/0009202 A1 | 1/2006 | Gallagher | |
| 2006/0014537 A1* | 1/2006 | Arai et al. | 455/435.1 |
| 2006/0019656 A1 | 1/2006 | Gallagher | |
| 2006/0019657 A1 | 1/2006 | Gallagher | |
| 2006/0019658 A1 | 1/2006 | Gallagher | |
| 2006/0025143 A1 | 2/2006 | Gallagher | |
| 2006/0025144 A1 | 2/2006 | Gallagher | |
| 2006/0025145 A1 | 2/2006 | Gallagher | |
| 2006/0025146 A1 | 2/2006 | Gallagher | |
| 2006/0025147 A1 | 2/2006 | Gallagher | |
| 2006/0079258 A1 | 4/2006 | Gallagher | |
| 2006/0079259 A1 | 4/2006 | Gallagher | |
| 2006/0079273 A1 | 4/2006 | Gallagher | |
| 2006/0079274 A1 | 4/2006 | Gallagher | |
| 2006/0098598 A1 | 5/2006 | Gallagher | |
| 2006/0114871 A1* | 6/2006 | Buckley et al. | 370/338 |
| 2006/0234705 A1* | 10/2006 | Oommen | 455/435.3 |
| 2007/0010221 A1* | 1/2007 | Howard et al. | 455/179.1 |
| 2007/0060125 A1* | 3/2007 | Rahim | 455/436 |
| 2007/0202875 A1* | 8/2007 | Dorsey et al. | 455/434 |
| 2007/0293222 A1* | 12/2007 | Vikberg et al. | 455/436 |

FOREIGN PATENT DOCUMENTS

| | | |
|---|---|---|
| EP | 1207708 B1 | 10/2004 |
| GB | 2282735 A | 4/1995 |
| WO | WO 9204796 A1 | 3/1992 |
| WO | WO 9724004 A1 | 7/1997 |
| WO | WO 9948312 A1 | 9/1999 |
| WO | WO 9948315 A1 | 9/1999 |
| WO | WO 0028762 A1 | 5/2000 |
| WO | WO 00051387 A1 | 8/2000 |
| WO | WO 02/45456 A1 | 6/2002 |
| WO | WO 03039009 A2 | 5/2003 |
| WO | WO 03039009 A3 | 5/2003 |
| WO | WO 03092312 A1 | 11/2003 |
| WO | WO 2004002051 A2 | 12/2003 |
| WO | WO 2004034219 A2 | 4/2004 |
| WO | WO 2004036770 | 4/2004 |
| WO | WO 2004039111 A1 | 5/2004 |
| WO | WO 2005006597 A1 | 1/2005 |
| WO | WO 2005107169 A1 | 11/2005 |
| WO | WO 2005107297 A1 | 11/2005 |
| WO | WO 2005114917 | 12/2005 |
| WO | WO 2005114918 A3 | 12/2005 |
| WO | PCT/US2005/040689 | 3/2006 |

OTHER PUBLICATIONS

U.S. Appl. No. 10/115,767, (Non-Final Office Action mailed: Dec. 22, 2005) filed Apr. 2, 2002, Jahangir Mohammed.

U.S. Appl. No. 10/115,835, (Non-Final Office Action mailed: Jul. 25, 2005) filed Apr. 2, 2002, Jahangir Mohammed.

U.S. Appl. No. 10/116,186, (Final Office Action mailed: Feb. 1, 2006) filed Apr. 2, 2002, Jahangir Mohammed.

U.S. Appl. No. 10/251,901, (Non-Final Office Action mailed: May 5, 2005) filed Sep. 20, 2002, Michael D. Gallagher.

U.S. Appl. No. 10/688,470, (Non-Final Office Action mailed: Dec. 15, 2005) filed Oct. 17, 2003, Michael D. Gallagher.

U.S. Appl. No. 11/004,439, (Non-Final Office Action mailed: Sep. 21, 2005) filed Dec. 3, 2004, Michael D. Gallagher.

*Ericsson Press Release*: "Ericsson presents the Mobile@Hometm concept," Mar. 21, 2001, http://www.ericsson.com/press/archive/2001Q1/20010321-0048.html, printed Mar. 21, 2006, pp. 1-2.

Claus Lindholt Hansen et al., "Mobile@Home- a New Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.

Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.

Wu, Jon c. et al., "Intelligent Handoff for Mobile Wireless Internet," *Mobile Networks and Applications*, 6, 2001 Kluwer Academic Publishers, Manufactured in the Netherlands (2001) 67-79.

"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.

"3rd Generation Partnership Project: Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.

U.S. Appl. No. 10/116,023, filed Apr. 2, 2002, Mohammed, Jahangir.
U.S. Appl. No. 11/004,439, filed Dec. 3, 2004, Gallagher, Michael.
U.S. Appl. No. 11/225,398, filed Sep. 12, 2005, Gallagher, Michael.
U.S. Appl. No. 11/225,871, filed Sep. 12, 2005, Gallagher, Michael.
U.S. Appl. No. 11/225,872, filed Sep. 12, 2005, Gallagher, Michael.
U.S. Appl. No. 11/226,610, filed Sep. 13, 2005, Gallagher, Michael.
U.S. Appl. No. 11/226,617, filed Sep. 13, 2005, Gallagher, Michael.
U.S. Appl. No. 11/227,573, filed Sep. 14, 2005, Gallagher, Michael.
U.S. Appl. No. 11/227,784, filed Sep. 14, 2005, Gallagher, Michael.
U.S. Appl. No. 11/227,840, filed Sep. 14, 2005, Gallagher, Michael.
U.S. Appl. No. 11/225,870, filed Sep. 12, 2005, Gallagher, Michael.
U.S. Appl. No. 11/227,842, filed Sep. 14, 2005, Gallagher, Michael.
U.S. Appl. No. 11/228,853, filed Sep. 15, 2005, Gallagher, Michael.
U.S. Appl. No. 11/229,470, filed Sep. 15, 2005, Gallagher, Michael.
U.S. Appl. No. 11/097,866, filed Mar. 31, 2005, Michael D. Gallagher et al.

Non-Final Office Action of U.S. Appl. No. 11/098,237, mailing date Aug. 24, 2006, Shi, Jianxiong et al.

Final Office Action on U.S. Appl. No. 11/098,237, mailing date Apr. 6, 2007, Shi, Jianxiong et al.

Non-Final Office Action of U.S. Appl. No. 11/098,237, mailing date May 13, 2008, Shi, Jianxiong, et al.

Final Office Action of U.S. Appl. No. 11/098,237, mailing date Oct. 3, 2008, Shi, Jianxiong, et al.

International Search Report and Written Opinion for PCT/US2005/016670, mailing date Aug. 11, 2005, Kineto Wireless, Inc.

International Preliminary Report on Patentability and Written Opinion for PCT/US2005/016670, mailing date Nov. 14, 2006, Kineto Wireless, Inc.

* cited by examiner

306

| LMAC IDENTIFIER | CREDIT SCORE | TIMESTAMP |
|---|---|---|
| LMAC(1) | CS(1) | T(1) |
| LMAC(2) | CS(2) | T(2) |
| ⋮ | ⋮ | ⋮ |
| LMAC(n-1) | CS(n-1) | T(n-1) |
| LMAC(n) | CS(n) | T(n) |

401 — LMAC IDENTIFIER
402 — CREDIT SCORE
403 — TIMESTAMP

| Credit Score | Scan Rate |
|---|---|
| 0 | ScanRate (0) |
| 1 | ScanRate (1) |
| 2 | ScanRate (2) |
| ⋮ | ⋮ |
| m-1 | ScanRate (m-1) |
| m | ScanRate (m) |

404 — Credit Score
405 — Scan Rate

Figure 4B

INTELLIGENT ACCESS POINT SCANNING WITH SELF-LEARNING CAPABILITY

CROSS REFERENCE TO RELATED APPLICATION

This application is related to commonly owned U.S. application Ser. No. 11/013,883, now United States Patent Publication US 2005/0186948, entitled "Apparatus And Method For Extending The Coverage Area Of A Licensed Wireless Communication System Using An Unlicensed Wireless Communication System," filed Dec. 15, 2004, which is incorporated herein by reference.

TECHNICAL FIELD

This invention relates generally to telecommunications and, more particularly, to techniques for accessing unlicensed wireless communication services.

BACKGROUND

Licensed mobile access (LMA) communication systems provide mobile wireless communications over large areas to individuals using wireless handsets. Licensed wireless systems include cellular telephone systems and/or Personal Communication Services (PCS) telephone systems. Wireless handsets include cellular telephones, PCS telephones, wireless-enabled personal digital assistants, wireless modems, and the like.

Licensed mobile access communication systems utilize public wireless signal frequencies that are licensed from a government entity. Licensees pay large fees for access to these frequencies, and make large capital investments in base station and switching equipment which is required to support communications over extended geographical areas. As a result, the cost of licensed wireless communication service is generally higher than voice and data services over wired communication networks such as the public switched telephone network (PSTN) and private cable systems, which do not pay license fees and which have lower and/or fully amortized capital costs.

Typically, licensed wireless base stations are installed approximately a mile apart from one another and mobile subscribers are handed off from one base station to another as the subscribers move through the coverage areas (cells) of each base station. The quality of the link between the wireless transceiver and any base station is dependent on factors such as weather conditions, distance between the base station and the subscriber, and multipath interference. In contrast, the quality of wired communication services is not affected by any of the aforementioned factors. As a result, the quality and reliability of service (e.g., voice quality, speed of data transfer and bit-error rate) in licensed wireless systems is generally inferior to the quality of service afforded by wired connections. Furthermore, in many areas, the availability of wired communication services is greater than the availability of licensed wireless communication services. Thus, the user of licensed wireless communication systems pays relatively high fees for limited availability and relatively low quality service.

As noted above, wired connections are extensively deployed and generally perform at a lower cost with higher quality voice and higher speed data services. The problem with wired connections is that they constrain the mobility of a user. To bridge the gap, unlicensed mobile access (UMA) technology has been developed to enable dual-mode (LMA and UMA) wireless handsets to access voice and data services provided by core mobile network through unlicensed wireless access points, such as IEEE 802.11 (e.g., Wi-Fi) access points or Bluetooth access points, for example. This technology is designed to seamlessly handover a licensed wireless connection to an unlicensed wireless connection whenever an unlicensed wireless link to a wired network is available. The unlicensed wireless connections operate over limited ranges (e.g., up to 100 meters) and provide high quality and high reliability links to wired Internet Protocol (IP) access networks.

UMA technology is described in detail in commonly owned copending U.S. application Ser. No. 11/013,883, entitled "Apparatus And Method For Extending The Coverage Area Of A Licensed Wireless Communication System Using An Unlicensed Wireless Communication System," filed Dec. 15, 2004 and incorporated herein by reference. In addition, a standard specification for UMA technology has been adopted by the European Telecommunications Standards Institute (see, ETSI TS 143 318 v6.0.0 2005-01) with respect to GSM and GPRS communication services.

A dual-mode wireless handset is capable of switching automatically and seamlessly between licensed and unlicensed mobile access networks. However, dual-mode operation exacts a cost in battery power, consumed by the unlicensed radio transceiver to support scanning for unlicensed wireless access points (UWAPs) while the handset is operating in cellular voice or data mode. For example, if the unlicensed radio is turned on every 2.5 seconds for access point scanning (a typical default scanning rate), the average current drain might be 2.2 milliamperes (ma) for a typical IEEE 802.11 chipset (e.g., the Broadcom BCM4317b chipset). The average current drain of the cellular radio in standby mode might be 2.5 ma, so the total power consumption of the dual-mode handset could be approximately twice that of a standalone cellular handset. Decreasing the default scan rate of the unlicensed radio will reduce the power consumption, but decreasing the scan rate too much will introduce delays (latency) in acquiring and accessing unlicensed wireless access points that are unacceptable to mobile subscribers. The UMA standard does not specify any mechanism for power management for the unlicensed radio subsystem in a dual-mode handset.

SUMMARY OF EMBODIMENTS OF THE INVENTION

In one embodiment, a method for intelligent access point scanning with self-learning capability includes detecting the identifier of a licensed mobile access cell (LMAC), obtaining a probability measure for accessing an unlicensed mobile access network (UMAN) through an unlicensed wireless access point (UWAP) within the licensed mobile access cell, and scanning for the unlicensed wireless access point with a scan rate that is determined by the probability measure. In one embodiment, the method also includes modifying the probability measure to reflect the results of the scan.

In one embodiment, an apparatus includes a wireless interface to communicate with a licensed mobile access service and with unlicensed wireless access points. The apparatus also includes a memory to store a table of LMAC identifiers and a processing device coupled with the memory and the wireless interface. The processing device is configured to detect an LMAC identifier, to obtain a probability measure from the table for accessing the UMAN through a UWAP within the LMAC, and to scan for the UWAP with a scan rate that is determined by the probability measure.

BRIEF DESCRIPTION OF THE DRAWINGS

FIG. 4A illustrates a data table in one embodiment of intelligent access point scanning with self-learning capability.

FIG. 4B illustrates a lookup table in one embodiment of intelligent access point scanning with self-learning capability.

DETAILED DESCRIPTION

Figure 1:
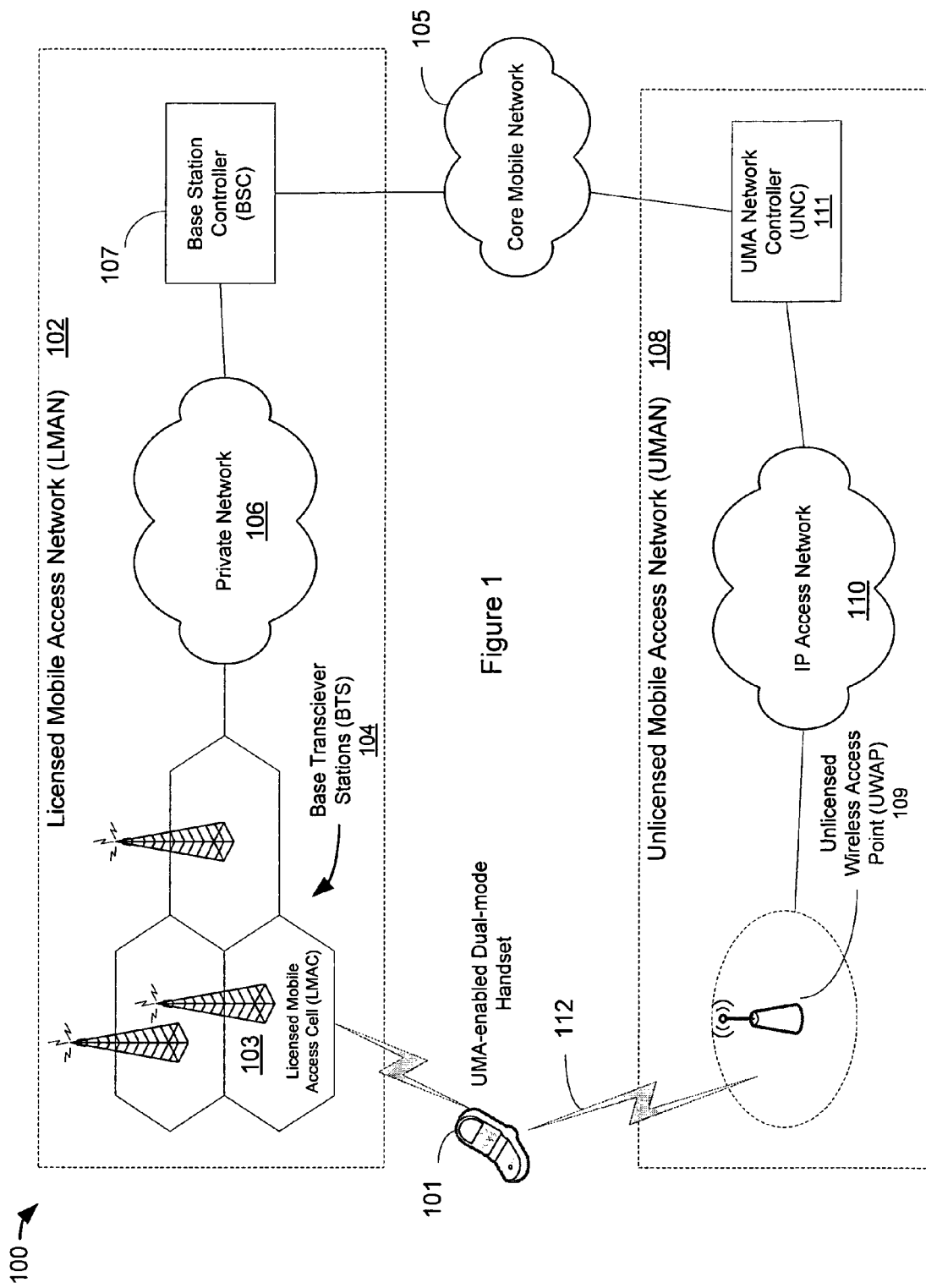
FIG. 1 illustrates a dual-mode system in one embodiment of intelligent access point scanning with self-learning capability.

Methods and apparatus for intelligent access point scanning with self-learning capability are described. In the following description, numerous specific details are set forth, such as examples of specific commands, named components, connections, data structures, etc., in order to provide a thorough understanding of embodiments of the present invention. It will be apparent, however, to one skilled in the art that embodiments of present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

Embodiments of the present invention include circuits and components, to be described below, which perform operations. Alternatively, the operations of the present invention may be embodied in machine-executable instructions, which may be used to cause a general-purpose or special-purpose processor programmed with the instructions to perform the operations. Alternatively, the operations maybe performed by a combination of hardware and software.

Embodiments of the present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form (e.g., software, processing application) readable by a machine (e.g., a computer). The machine-readable medium may include, but is not limited to: magnetic storage media (e.g., floppy diskette); optical storage media (e.g., CD-ROM); magneto-optical storage media; read only memory (ROM); random access memory (RAM); erasable programmable memory (e.g., EPROM and EEPROM); flash memory; electrical, optical, acoustical or other form of propagated signal; (e.g., carrier waves, infrared signals, digital signals, etc.); or other type of medium suitable for storing electronic instructions.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

The term "coupled to" as used herein may mean coupled directly to or indirectly to through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines, and each of the single signal lines may alternatively be buses.

In the following description, embodiments of the invention may be described in the context of a GSM/GPRS cellular radio system for clarity and simplicity of explanation. One having skill in the art will appreciate that embodiments of the invention may be practiced in the context of other licensed wireless communication systems and technologies such as, for example, CDMA (code division multiple access), FDMA (frequency division multiple access) and TDMA (time division multiple access) systems using non-GSM protocols.

FIG. 1 illustrates a system 100 in which embodiments of the present invention may be practiced. It will be appreciated by those skilled in the art that other system configurations may also be used to practice embodiments of the invention. In FIG. 1, a UMA-enabled dual-mode wireless handset (handset) 101 is equipped to communicate over a licensed mobile access network (LMAN) 102 operated by a cellular service provider. When the handset is within range of a licensed mobile access cell (LMAC) 103 of a cellular base transceiver station (BTS) 104, it accesses the core mobile network 105 of the service provider through a private network 106 and a base station controller (BSC) 107 operated by the service provider, and updates its location with the core mobile network 105.

The handset 101 is also equipped to communicate over an unlicensed mobile access network (UMAN) 108 with unlicensed wireless access points (UWAPs) (e.g., Wi-Fi and Bluetooth access points) such UWAP 109 with access to the core mobile network 105 through a broadband IP network 110. The UMAN includes a UMA network controller (UNC) 111, operated by the service provider, which routes voice and data communications to the core mobile network 105.

When the handset 101 is connected to the licensed mobile access network 102, it scans for unlicensed wireless access points to which the handset is allowed to connect (e.g., unencrypted public or private access points or encrypted access points for which the wireless handset has a pass phrase, such as a WEP pass phrase in an IEEE 802.11 wireless network) in a manner described in detail below. When the handset 101 moves within range of such an unlicensed wireless access point, and detects the access point, the handset negotiates a connection.

Upon connecting, the handset registers with the UMA Network Controller 111 over the broadband IP network 110, to be authenticated and authorized to access voice and data services over the broadband IP network 110 via the unlicensed wireless connection 112. Upon UMA registration, the handset may optionally decide to update its location with core mobile network 105, and from that point on all mobile voice and data traffic is routed to the handset 101 via the UMAN 108 rather than the LMAN 102.

In one embodiment, dual-mode wireless handset 101 may be equipped with a transceiver for a licensed wireless communication service (e.g., GSM/GPRS, CDMA, FDMA and the like) that provides licensed mobile access (LMA) to the core mobile network 105 of the licensed wireless communication service through licensed mobile access network (LMAN) 102. Handset 101 may also be equipped with a transceiver for an unlicensed wireless connection (e.g., IEEE 802.11 and/or Bluetooth) that provides unlicensed mobile access (UMA) to the core mobile network 105 of the licensed wireless communication service via unlicensed wireless access points such as UWAP 109 and wired IP access networks such as IP access network 110.

In LMA mode, when the handset comes within range of a licensed mobile access cell (LMAC), it identifies its current location by an identifier of the LMAC. In one embodiment, each LMAC may be identified by a location area identifier (LAI), which is common to a group of LMACs, and by a cell identifier (CI) within the LAI. Together, the LAI and the CI may make up a global cell identifier (GCI) that uniquely identifies each LMAC.

In one embodiment, when the handset is in LMA mode and within range of an LMAC, it detects the identifier of the LMAC and compares the identifier with a table of LMAC identifiers to determine whether the handset has previously been within range of the LMAC and whether the handset has successfully accessed a UWAP within range of the LMAC. If the data in the table contains a record of the LMAC, the handset obtains a parameter from the table that is indicative of the likelihood of successfully accessing a UWAP within the LMAC.

As described in greater detail below, the parameter may represent a "credit score" or probability measure for accessing a UWAP within the LMAC, based on prior experience within the LMAC. The parameter may then be used to enter a lookup table that specifies a scan rate that the unlicensed transceiver will use to search for a UWAP. The higher the parameter value, the greater the probability of finding a UWAP within the LMAC that can successfully register the wireless handset with the UMAN.

Each time a search for a UWAP within a particular LMAC is successful, and a connection to the UMAN is established, the credit score for that LMAC may be increased, resulting in an increased scan rate the next time the wireless handset roams onto that LMAC. Conversely, if the search for a UWAP is unsuccessful, or the wireless handset is unable to connect to the UMAN through a UWAP, the credit score for that LMAC may be decreased, resulting in a decreased scan rate the next time the wireless handset roams onto that LMAC.

Figure 2:
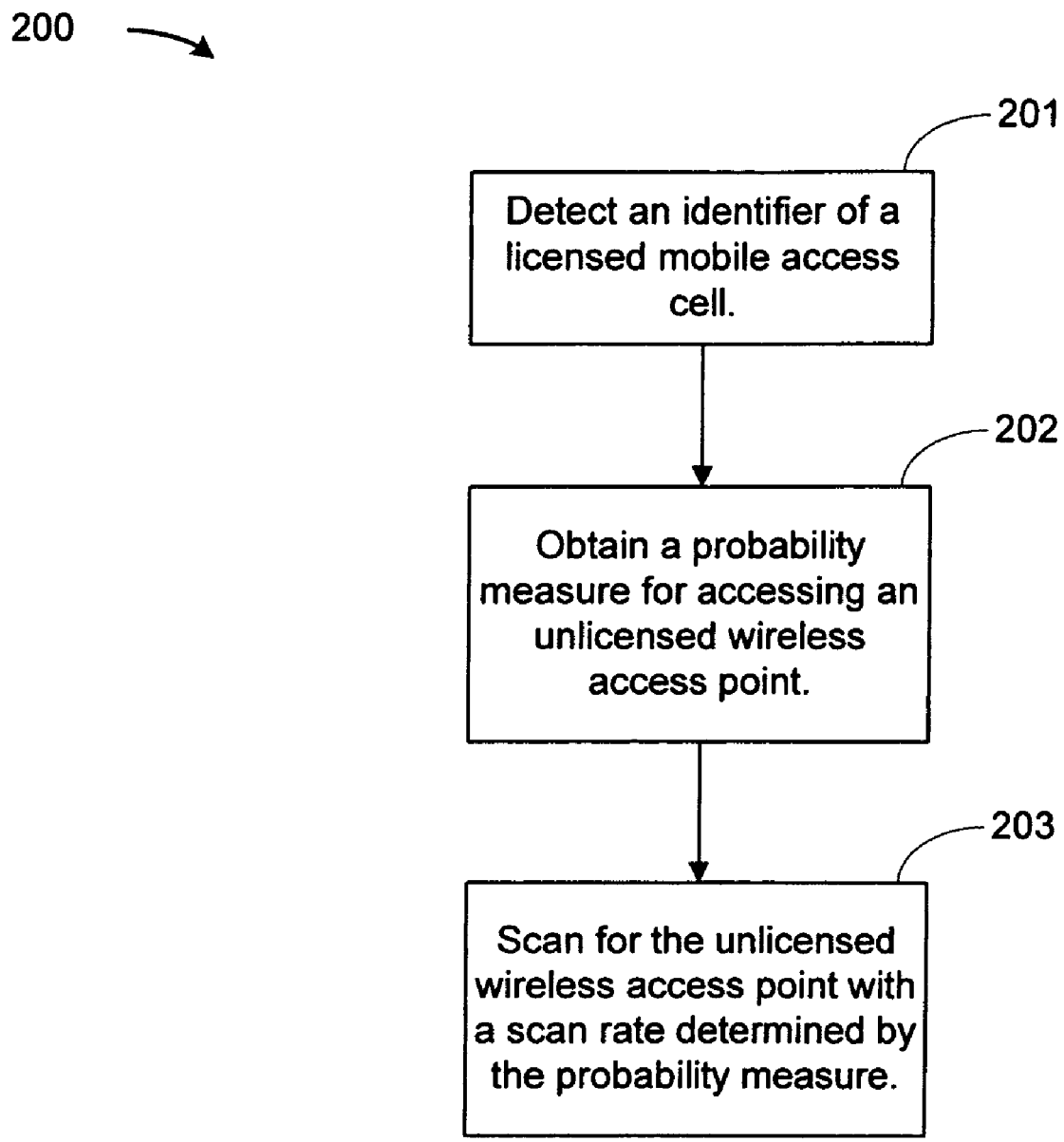
FIG. 2 illustrates a method in one embodiment of intelligent access point scanning with self-learning capability.

FIG. 2 illustrates one embodiment 200 of this method. In step 201, the handset detects the identifier of a licensed mobile access cell. In step 202, the handset obtains the probability measure associated with the licensed mobile access cell for accessing an unlicensed wireless access point to the unlicensed mobile access network. In step 203, the handset scans for an unlicensed wireless access point to the unlicensed wireless access network with a scan rate determined by the probability measure.

Figure 3:
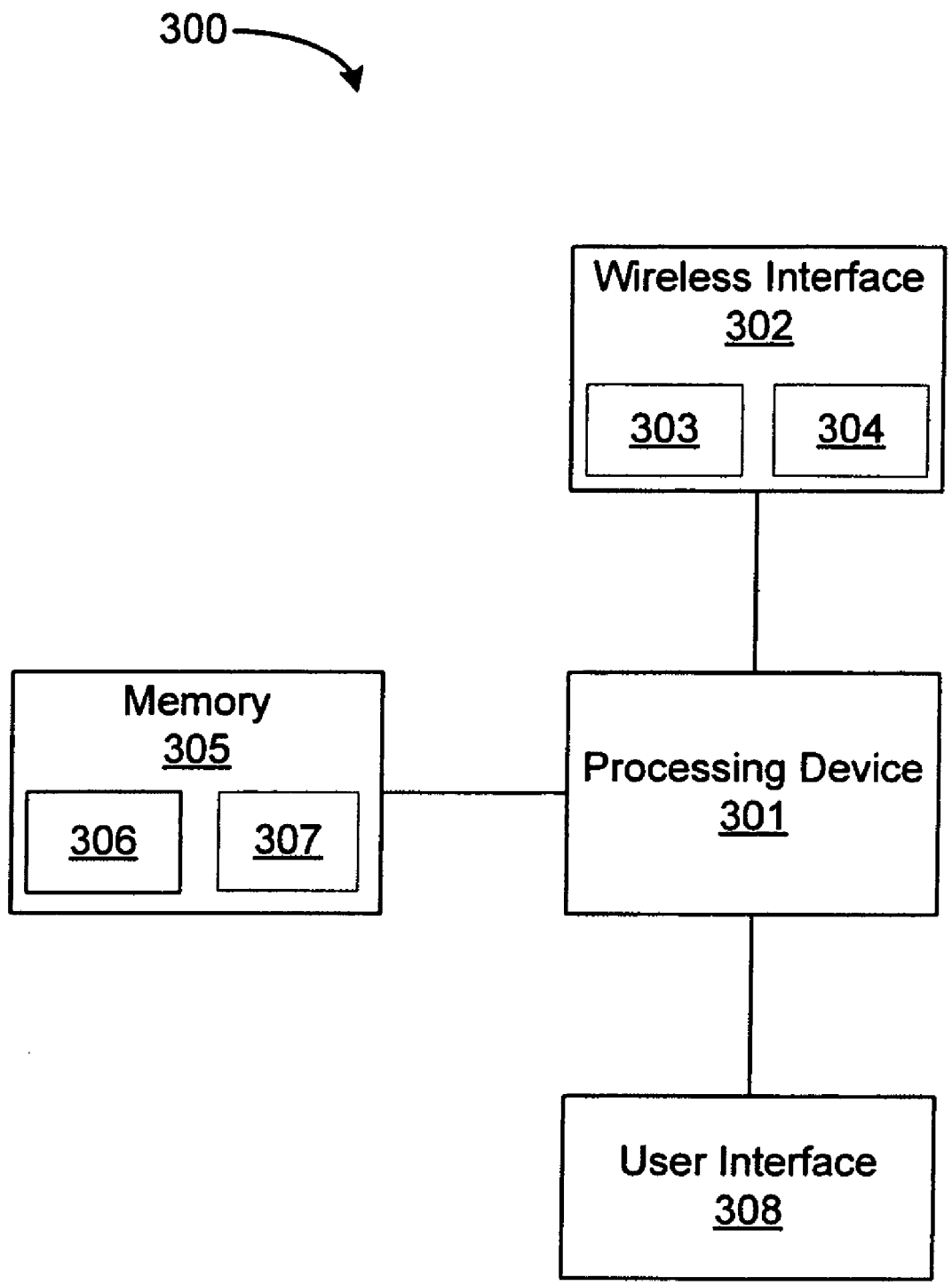
FIG. 3 illustrates a dual-mode wireless handset in one embodiment of intelligent access point scanning with self-learning capability.

FIG. 3 illustrates a dual-mode wireless handset 300 in one embodiment of intelligent access point scanning with self-learning capability. Wireless handset 300 includes a processing device 301 which may be a general-purpose processor (e.g., a microprocessor), special purpose processor such as a digital signal processor (DSP) or other type of device such as a controller or field programmable gate array (FPGA). Processing device 301 may be coupled with a wireless interface 302, which may include a licensed mobile access transceiver 303 (e.g., a GSM or CDMA transceiver or the like) adapted to communicate wirelessly with a licensed mobile access network, and an unlicensed mobile access transceiver 304 (e.g., an IEEE 802.11 or Bluetooth transceiver or the like) adapted to communicate with an unlicensed mobile access network.

Processing device 301 may also be coupled with a memory 305, which may be any combination of volatile and/or non-volatile memory capable of storing data and/or instructions. Memory 305 may include an area of memory configured as a data table 306 to hold information relating to licensed mobile access cells as described in greater detail below. Memory 305 may also include an area of memory configured as a lookup table 307, which may be used to associate the credit scores (i.e., probability measures) of each LMAC in data table 306 with a UWAP scan rate. Handset 300 may also include a user interface 308 coupled with the processing device 301 to enable voice and data input and output for a user of the wireless handset 300.

Figure 4C:
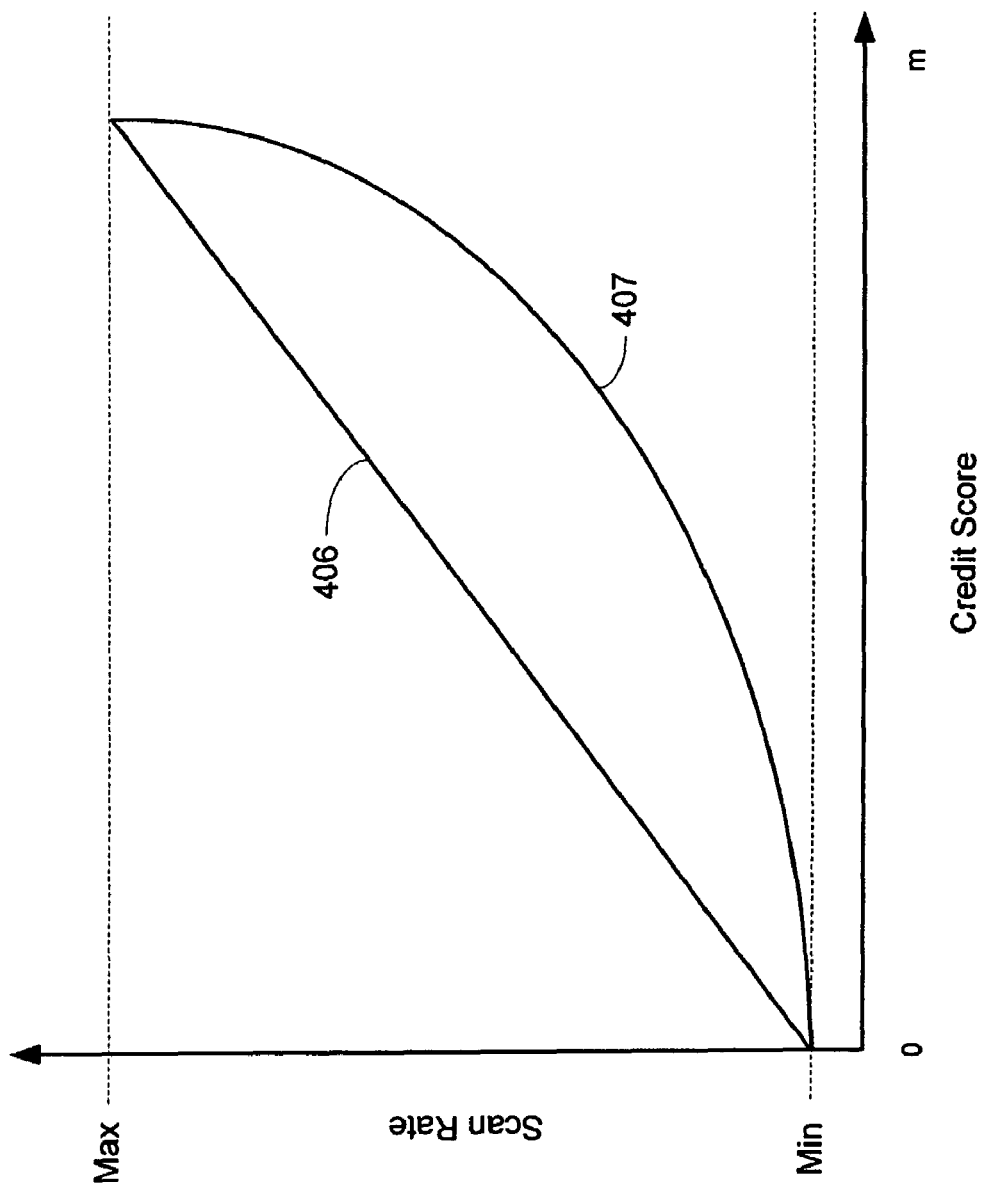
FIG. 4C illustrates scan functions in one embodiment of intelligent access point scanning with self-learning capability.

FIG. 4A illustrates an exemplary logical structure of data table 306. Physical structures of data tables in memory are known in the art and, accordingly, are not described in detail. Data table 306 may include a list 401 of n LMAC identifiers LMAC(i) (e.g., LMAC(1), LMAC (2), . . . , LMAC (n)), which may be global cell identifiers, for example. The LMAC identifiers may consist of two parts: a first part common to a local group of LMACs, denoting an LMA service area (e.g., a local area identifier, LAI(i) for example), and a second part that identifies a particular LMAC within the local group of LMACS (e.g., a cell identifier, CI(i) for example).

Data table 306 may also contain a list 402 of n credit scores CS(i) (e.g., CS(1), CS(2), . . . , CS(n)) corresponding to the list 401 of LMAC identifiers LMAC(i), where each credit score in the list denotes a probability measure for successfully connecting with a UMAN through a UWAP in the corresponding LMAC. Data table 306 may also contain a list 403 of timestamps T(i) (e.g., T(1), T(2), . . . , T(n)), one for each LMAC identifier in the list 401 of LMAC identifiers, denoting the latest (i.e., most recent) time that the wireless handset has made a successful UMA connection to the UMAN through a UWAP in the corresponding LMAC. Each timestamp T(i) may include both time and date information. Timestamps T(i) may be derived from an internal clock (not shown) in handset 300. Alternatively, timestamps T(i) may be derived from system clocks in LMAN 102 and/or UMAN 108 as are known in the art.

FIG. 4B illustrates an exemplary logical structure of lookup table 307. Physical structures of lookup tables in memory are known in the art and, accordingly, are not described in detail. Lookup table 307 may have an entry column 404 and an output column 405. The entry column of lookup table 307 may be a list of credit scores ranging from zero to a maximum value m, and the output column of lookup table 307 may be a list of scan rates ranging from a minimum scan rate corresponding to a credit score of zero, to a maximum scan rate corresponding to the maximum credit score m. In one embodiment, the minimum scan rate corresponding to a credit score of zero may be a zero scan rate (i.e., no scan).

Lookup table 307 may define any arbitrary functional relationship between credit scores and scan rates. For example, there may be a linear relationship as illustrated by curve 406 in FIG. 4C, or a nonlinear relationship as illustrated by curve 407 in FIG. 4C. It will be appreciated that while curves 406 and 407 are illustrated as continuous curves, the actual values of scan rates may be discrete values corresponding to discrete values of credit scores in lookup table 307.

Figure 5:
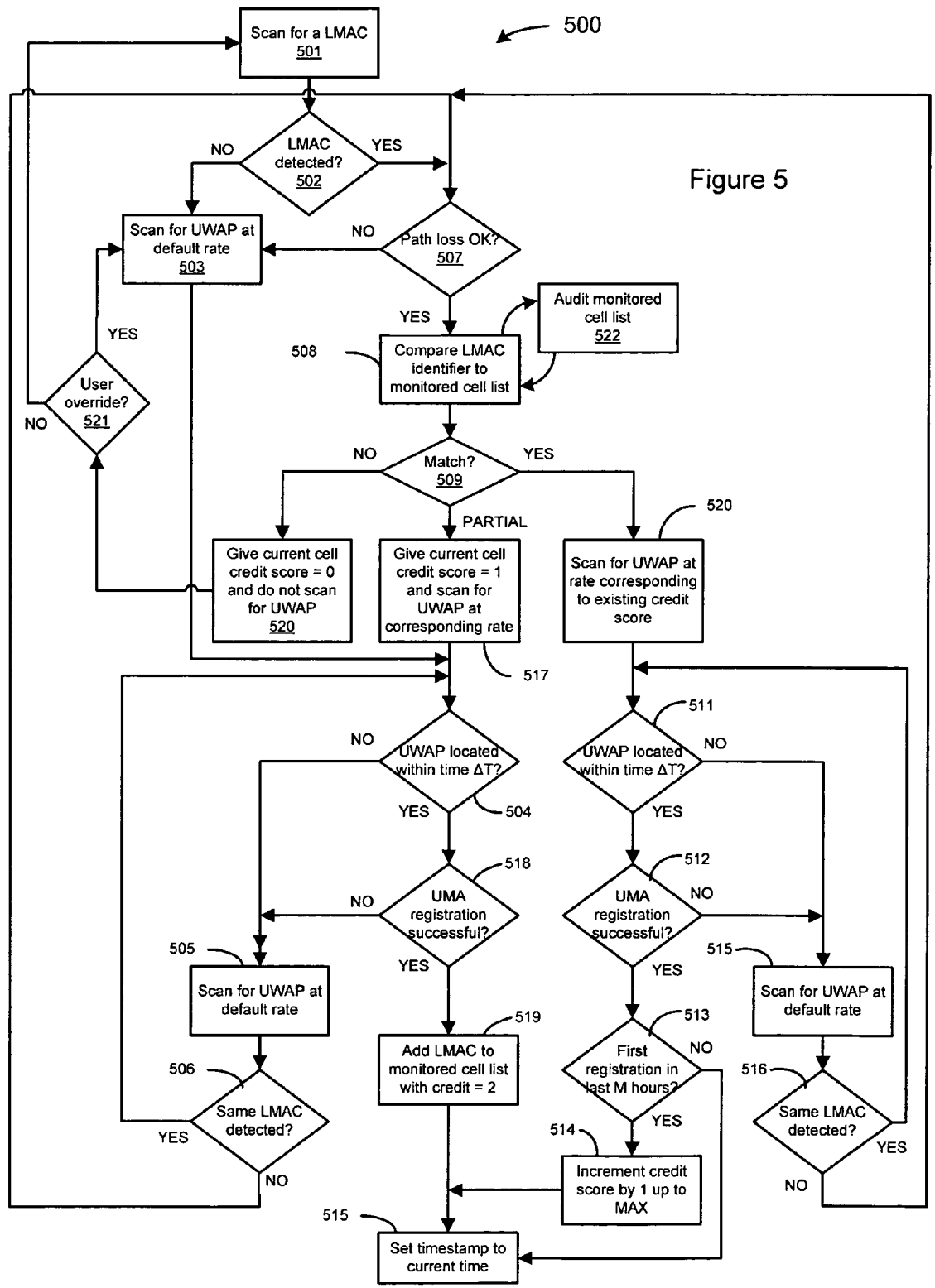
FIG. 5 illustrates another method in one embodiment of intelligent access point scanning with self-learning capability.

FIG. 5 is a flowchart illustrating a method in one embodiment of intelligent access point scanning with self-learning capability. The method begins when handset 300 scans for an LMAC such as LMAC 103 (step 501). If an LMAC is not detected at step 502, the handset 300 scans for a UWAP at a default rate (step 503). If a UWAP is not detected within a specified time period ΔT (e.g., 10 minutes) at step 504, the handset 300 continues to scan at the default scan rate (step 505) and checks whether a new LMAC has been detected (step 506).

If a new LMAC is not detected at step 506, the method continues looping through steps 504 and 505 until a new LMAC is detected at step 506. If a new LMAC is detected at step 506, the method continues at step 507 where path loss parameters for the detected LMAC are evaluated (e.g., to determine link quality). If the path loss parameters are below a specified threshold, the method reverts to the "no LMAC detected" mode at step 503. If the path loss is OK at step 507, the handset 300 compares the identifier of the detected LMAC to the list 401 of LMAC identifiers (monitored cell list) in data table 306 (step 508). At step 509, if the identifier of the (detected) LMAC matches both the LAI and the CI of an LMAC identifier in the list 401 of LMAC identifiers in data table 306, the handset 300 scans for a UWAP at a scan rate corresponding to the credit score in the list 402 of credit scores that is associated with the detected LMAC (step 510).

The scan rate is determined by locating the credit score of the detected LMAC in the list 404 of credit scores in lookup table 307 to a corresponding scan rate in the list of scan rates 405 in lookup table 307. If a UWAP is located within the specified time ΔT at step 511, the handset 300 attempts to register with the UMAN 102 at step 512. If the registration is successful at step 512, the handset 300 compares the current time (from local or network clocks as described above) with the timestamp in the list of timestamps 403 associated with the detected LMAC (step 513). If the registration with the UMAN 102 is the first registration in the last M hours (e.g., 12 hours), then the credit score for the detected LMAC is incremented by one count (step 514). Next, the timestamp is updated to the current time at step 515. If, at step 513, the registration with the UMAN 102 is not the first registration in the last M hours, the credit score for the detected LMAC is not incremented and the timestamp is updated to the current time at step 515.

Returning to step 511, if a UWAP is not located within the specified time ΔT, or, if at step 512, the handset 300 does not register successfully with UMAN 102, handset 300 scans for a UWAP at the default rate (step 515). If the detected LMAC identifier does not change at step 516, the method continues at step 511. If the detected LMAC at step 516 changes, the method continues at step 507 as previously described.

If, at step 509, the identifier of the detected LMAC matches only the LAI of an LMAC identifier in the list 401 of LMAC identifiers in data table 306 (e.g., there is an LAI match without a CI match), the method assigns a credit score of 1 to the identified LMAC and the handset 300 scans for a UWAP at a scan rate corresponding to a credit score of 1 in lookup table 307 (step 517). The method continues with a return to step 504, where, if a UWAP is not located within the time ΔT, the method continues at step 505 as previously described. If, at step 504, a UWAP is located within the time ΔT, and UMA registration is successful at step 518, the currently detected LMAC is added to the monitored cell list (list 401) with a credit score of 2 at step 519, and the timestamp associated with the detected LMAC is updated to the current time at step 515. If, at step 518, the registration with the UMAN is not successful, scanning for a UWAP continues at the default rate at step 505.

If, at step 509, the identifier of the currently detected LMAC does not match all or a portion of an LMAC identifier in the monitored cell list 401, the currently detected LMAC is entered in the list with a credit score of 0 and scanning for a UWAP is suspended (step 520). At step 521, an unprompted manual override option may be invoked by the user of handset 300. If the user invokes a manual override at step 521, the method continues to scan at the default scan rate at step 503. Otherwise, the method scans for an LMAC at step 501.

The method 500 may also include an audit of the monitored cell list (step 522). In step 522, each timestamp in the list of timestamps 403 of each LMAC identifier in the list 401 of LMAC identifiers is examined to determine if the timestamp is older than a specified period of time (e.g., M hours) compared to the current time. If the timestamp is older than the specified period of time, then the credit score for the corresponding LMAC identifier is decremented by one count. If the decremented count reduces the credit score of an LMAC identifier in the table of LMAC identifiers to a specified minimum value, then the LMAC identifier is deleted from the table of LMAC identifiers.

Step 521 may also include a limit on the number of LMAC identifiers in the table of LMAC identifiers. In step 521, if the table of LMAC identifiers includes the maximum number of LMAC identifiers n, step 521 may delete the LMAC identifier with the least credit score (probability measure) and, if two or more LMAC identifiers have the same credit score, then the LMAC identifier with the oldest timestamp may be deleted.

Thus, embodiments of intelligent access point scanning with self-learning capability have been described. While some specific embodiments of the invention have been shown, the invention is not to be limited to these embodiments. The invention is to be understood as limited only by scope of the appended claims.

What is claimed is:

1. A method, comprising:
   detecting an identifier of a licensed mobile access cell (LMAC);
   obtaining a probability measure for accessing an unlicensed wireless access point (UWAP) within the LMAC; and
   scanning for the UWAP with a scan rate determined by the probability measure.

2. The method of claim 1, further comprising modifying the probability measure to reflect a result of scanning for the UWAP within the LMAC.

3. The method of claim 1, wherein obtaining the probability measure for accessing the UWAP within the LMAC comprises:
   comparing the identifier of the LMAC to LMAC identifiers in a table, each LMAC identifier in the table having a corresponding probability measure; and
   selecting the probability measure corresponding to an LMAC identifier in the table if the identifier of the LMAC matches the LMAC identifier in the table; else
   selecting a first default probability measure if the identifier of the LMAC partially matches an LMAC identifier in the table; else
   selecting a second default probability measure if the identifier of the LMAC does not match any LMAC identifier in the table.

4. The method of claim 3, wherein the first default probability measure corresponds to a minimum non-zero scan rate and the second default probability measure corresponds to a zero scan rate.

5. The method of claim 3, wherein the identifier of the LMAC matches an LMAC identifier in the table, each LMAC identifier in the table having a corresponding timestamp, the method further comprising:
    locating the UWAP within the LMAC within a first period of time;
    attempting to acquire a registration with an unlicensed mobile access network (UMAN);
    setting the corresponding timestamp to a registration time; and
    incrementing the corresponding probability measure if the registration is acquired and is a first registration with the UMAN within a second period of time.

6. The method of claim 3, wherein the identifier of the LMAC matches an LMAC identifier in the table, the method further comprising:
    scanning for the UWAP within the LMAC at a scan rate associated with the matched LMAC identifier in the table; and
    scanning for the UWAP at a first default scan rate when failing to locate the UWAP within a first period of time.

7. The method of claim 3, wherein the identifier of the LMAC partially matches an LMAC identifier in the table, the method further comprising:
    locating the UWAP within the LMAC within a first period of time;
    attempting to acquire a registration with an unlicensed mobile access network (UMAN); and
    adding the identifier of the LMAC to the table of LMAC identifiers, setting a corresponding probability measure to an initial value and setting a corresponding timestamp to a registration time, if the registration is acquired.

8. The method of claim 7, wherein the table of LMAC identifiers is limited to a maximum number of entries, the method further comprising:
    determining whether the table of LMAC identifiers comprises the maximum number of entries; and
    deleting an LMAC identifier with a least probability measure if the LMAC identifier is the only LMAC identifier with the least probability measure; and
    deleting the LMAC identifier with the least probability measure and an oldest timestamp if two or more LMAC identifiers have the least probability measure.

9. The method of claim 3, wherein the identifier of the LMAC partially matches an LMAC identifier in the table, the method further comprising:
    scanning for the UWAP within the LMAC at a scan rate associated with the partially matched LMAC identifier in the table; and
    scanning for the UWAP at a first default scan rate when failing to locate the UWAP within a first period of time.

10. The method of claim 5, further comprising auditing the table of LMAC identifiers every second period of time, wherein auditing comprises:
    determining, for each LMAC identifier in the table of LMAC identifiers, whether the corresponding timestamp is older than the second period of time for each LMAC identifier in the table of LMAC identifiers; and
    decrementing the corresponding probability measure if the corresponding timestamp is older than the second period of time; and
    deleting the LMAC identifier from the table of LMAC identifiers if decrementing the corresponding probability measure reduces the corresponding probability measure to a minimum value.

11. The method of claim 7, further comprising auditing the table of LMAC identifiers every second period of time, wherein auditing comprises:
    determining, for each LMAC identifier in the table of LMAC identifiers, whether the corresponding timestamp is older than the second period of time for each LMAC identifier in the table of LMAC identifiers; and
    decrementing the corresponding probability measure if the corresponding timestamp is older than the second period of time; and
    deleting the LMAC identifier from the table of LMAC identifiers if decrementing the corresponding probability measure reduces the corresponding probability measure to a minimum value.

12. The method of claim 1, wherein the scan rate is a function of the probability measure.

13. The method of claim 12, wherein the probability measure is limited to a range between a minimum value and a maximum value, and wherein the scan rate increases monotonically with increases in the probability measure and decreases monotonically with decreases in the probability measure.

14. The method of claim 13, wherein the scan rate is one of a linear function of the probability measure and a nonlinear function of the probability measure.

15. The method of claim 3, wherein the identifier of the LMAC comprises a global cell identifier (GCI), wherein the GCI comprises a location area identifier (LAI) and a cell identifier (CI).

16. The method of claim 15, wherein the identifier of the LMAC partially matches an LMAC identifier in the table when the LAI of the LMAC matches an LAI of the LMAC identifier in the table and the CI of the LMAC does not match the CI of the LMAC identifier in the table.

17. The method of claim 6, wherein the first default scan rate comprises a minimum non-zero scan rate corresponding to the first default probability measure.

18. An apparatus, comprising:
    a wireless interface to communicate with a licensed mobile access service and with unlicensed wireless access points;
    a memory to store licensed mobile access cell (LMAC) identifiers in a table; and
    a processor coupled with the memory and the wireless interface, the processor to
        detect an identifier of an LMAC;
        obtain a probability measure from the table for accessing an unlicensed wireless access point (UWAP) within the LMAC; and
        scan for the UWAP with a scan rate determined by the probability measure.

19. The apparatus of claim 18, the processor further to modify the probability measure to reflect a result of scanning for the UWAP within the LMAC.

20. The apparatus of claim 18, wherein to obtain the probability measure for accessing the UWAP within the LMAC, the processor to:
    compare the identifier of the LMAC to the LMAC identifiers in the table, each LMAC identifier in the table having a corresponding probability measure; and
    select the probability measure in the table corresponding to the LMAC identifier in the table if the identifier of the LMAC matches an LMAC identifier in the table; else select a first default probability measure if the identifier of the LMAC partially matches an LMAC identifier in the table; else select a second default probability measure if the identifier of the LMAC does not match an LMAC identifier in the table.

21. The apparatus of claim 20, wherein the first default probability measure corresponds to a minimum non-zero scan rate and the second default probability measure corresponds to a zero scan rate.

22. The apparatus of claim 20, wherein the identifier of the LMAC matches an LMAC identifier in the table, each LMAC identifier in the table having a corresponding timestamp, the processor further to:

locate the UWAP within the LMAC within a first period of time;

attempt to acquire a registration with an unlicensed mobile access network (UMAN);

set the corresponding timestamp to a registration time; and increment the corresponding probability if the registration is acquired and is a first registration with the UMAN within a second period of time.

23. The apparatus of claim 20, wherein the identifier of the LMAC matches an LMAC identifier in the table, and wherein the processor fails to locate the UWAP within the LMAC within a first period of time, the processor further to scan for the UWAP at a first default scan rate.

24. The apparatus of claim 20, wherein the identifier of the LMAC partially matches an LMAC identifier in the table, the processor further to:

locate the UWAP within the LMAC within a first period of time;

attempt to acquire a registration with an unlicensed mobile access network (UMAN); and add the identifier of the LMAC to the table of LMAC identifiers, set a corresponding probability measure to an initial value and set a corresponding timestamp to a registration time, if the registration is acquired.

25. The apparatus of claim 24, wherein the table of LMAC identifiers is limited to a maximum number of entries, the processor further to:

determine whether the table of LMAC identifiers comprises the maximum number of entries; and delete an LMAC identifier with a least probability measure if the LMAC identifier is the only LMAC identifier with the least probability measure; and delete the LMAC identifier with the least probability measure and an oldest timestamp if two or more LMAC identifiers have the least probability measure.

26. The apparatus of claim 20, wherein the identifier of the LMAC partially matches an LMAC identifier in the table, and wherein the processor fails to locate the UWAP within the LMAC within a first period of time, the processor further to scan for the UWAP at a first default scan rate.

27. The apparatus of claim 22, the processor further to audit the table of LMAC identifiers every second period of time, wherein for each LMAC identifier in the table of LMAC identifiers, the processor to determine whether the corresponding timestamp is older than the second period of time; and decrement the corresponding probability measure if the corresponding timestamp is older than the second period of time; and delete the LMAC identifier from the table of LMAC identifiers if a decrement to the corresponding probability measure reduces the corresponding probability measure to a minimum value.

28. The apparatus of claim 24, the processor further to audit the table of LMAC identifiers every second period of time, wherein for each LMAC identifier in the table of LMAC identifiers, the processor to determine whether the corresponding timestamp is older than the second period of time; and decrement the corresponding probability measure if the corresponding timestamp is older than the second period of time; and delete the LMAC identifier from the table of LMAC identifiers if a decrement to the corresponding probability measure reduces the corresponding probability measure to a minimum value.

29. The apparatus of claim 18, wherein the scan rate is a function of the probability measure.

30. The apparatus of claim 29, wherein the probability measure is limited to a range between a minimum value and a maximum value, and wherein the scan rate increase monotonically with the probability measure.

31. The apparatus of claim 30, wherein the scan rate is one of a linear function of the probability measure and a nonlinear function of the probability measure.

32. An article of manufacture including a computer-readable medium having instructions stored thereon, which when executed by a data-processing system, cause the data-processing system to perform a method, comprising:

detecting an identifier of a licensed mobile access cell (LMAC);

obtaining a probability measure for accessing an unlicensed mobile access point (UWAP) within the LMAC; and scanning for the UWAP with a scan rate determined by the probability measure.

33. The article of manufacture of claim 32, the method further comprising modifying the probability measure to reflect a result of scanning for the UWAP within the LMAC.

34. The article of manufacture of claim 32, wherein obtaining the probability measure for accessing the UWAP within the LMAC comprises:

comparing the identifier of the LMAC to LMAC identifiers in a table, each LMAC identifier in the table having a corresponding probability measure; and selecting the probability measure in the table corresponding to the LMAC identifier in the table if the identifier of the LMAC matches an LMAC identifier in the table; else selecting a first default probability measure if the identifier of the LMAC partially matches an LMAC identifier in the table; else selecting a second default probability measure if the identifier of the LMAC does not match an LMAC identifier in the table.

35. The article of manufacture of claim 34, wherein the first default probability measure corresponds to a minimum non-zero scan rate and the second default probability measure corresponds to a zero scan rate.

36. The article of manufacture of claim 34, wherein the identifier of the LMAC matches an-LMAC identifier in the table, each LMAC identifier in the table having a corresponding timestamp, the method further comprising:

locating the UWAP within the LMAC within a first period of time;

attempting to acquire a registration with an unlicensed mobile access network (UMAN);

setting the corresponding timestamp to a registration time; and incrementing the corresponding probability measure if the registration is acquired and is a first registration with the UMAN within a second period of time.

37. The article of manufacture of claim 34, wherein the identifier of the LMAC matches an LMAC identifier in the table, the method further comprising:
    scanning for the UWAP within the LMAC at a scan rate associated with the matched LMAC identifier in the table; and
    scanning for the UWAP at a first default scan rate when failing to locate the UWAP within a first period of time.

38. The article of manufacture of claim 34, wherein the identifier of the LMAC partially matches an LMAC identifier in the table, the method further comprising:
    locating the UWAP within the LMAC within a first period of time;
    attempting to acquire a registration with an unlicensed mobile access network (UMAN); and
    adding the identifier of the LMAC to the table of LMAC identifiers, setting the corresponding probability measure to an initial value and setting a corresponding timestamp to a registration time, if the registration is acquired.

39. The article of manufacture of claim 38, wherein the table of LMAC identifiers is limited to a maximum number of entries, the method further comprising:
    determining whether the table of LMAC identifiers comprises the maximum number of entries; and
    deleting an LMAC identifier with a least probability measure if the LMAC identifier is the only LMAC identifier with the least probability measure; and
    deleting the LMAC identifier with the least probability measure and an oldest timestamp if two or more LMAC identifiers have the least probability measure.

40. The article of manufacture of claim 34, wherein the identifier of the LMAC partially matches an LMAC identifier in the table, the method further comprising:
    scanning for the UWAP within the LMAC at a scan rate associated with the partially matched LMAC identifier in the table; and
    scanning for the UWAP at a first default scan rate when failing to locate the UWAP within a first period of time.

41. The article of manufacture of claim 36, the method further comprising auditing the table of LMAC identifiers every second period of time, wherein auditing comprises:
    determining, for each LMAC identifier in the table of LMAC identifiers, whether the corresponding timestamp is older than the second period of time; and
    decrementing the corresponding probability measure, if the corresponding timestamp is older than the second period of time; and
    deleting the LMAC identifier from the table of LMAC identifiers if decrementing the corresponding probability measure reduces the corresponding probability measure to a minimum value.

42. The article of manufacture of claim 38, the method further comprising auditing the table of LMAC identifiers every second period of time, wherein auditing comprises:
    determining, for each LMAC identifier in the table of LMAC identifiers, whether the corresponding timestamp is older than the second period of time; and
    decrementing the corresponding probability measure, if the corresponding timestamp is older than the second period of time; and
    deleting the LMAC identifier from the table of LMAC identifiers if decrementing the corresponding probability measure reduces the corresponding probability measure to a minimum value.

43. The article of manufacture of claim 32, wherein the scan rate is a function of the probability measure.

44. The article of manufacture of claim 43, wherein the probability measure is limited to a range between a minimum value and a maximum value, and wherein the scan rate increase monotonically with the probability measure.

45. The article of manufacture of claim 44, wherein the scan rate is one of a linear function of the probability measure and a nonlinear function of the probability measure.

46. An apparatus comprising:
    means for accessing a licensed wireless communication service;
    means for accessing a wired communication service via unlicensed wireless access points; and
    means for conserving power while scanning for unlicensed wireless access points within a service area of the licensed wireless communication service, wherein the means for conserving power comprises:
    means for estimating a likelihood of accessing an unlicensed wireless access point within the service area of the licensed wireless communication service; and
    means for adjusting a scan rate based on the likelihood of accessing the unlicensed wireless access point.

* * * * *